(12) United States Patent
Vrague Noble et al.

(10) Patent No.: US 12,556,450 B2
(45) Date of Patent: Feb. 17, 2026

(54) HETEROGENEOUS NETWORK HARVESTING MODELING FOR WORKLOAD PLACEMENT

(71) Applicant: Dell Products L.P., Round Rock, TX (US)

(72) Inventors: Diego Vrague Noble, Pelotas (BR); Eduardo Vera Sousa, Niterói (BR); Karen Braga Enes, Belo Horizonte (BR); Karen Stéfany Martins, Belo Horizonte (BR)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/628,521

(22) Filed: Apr. 5, 2024

(65) Prior Publication Data

US 2025/0317357 A1    Oct. 9, 2025

(51) Int. Cl.
*H04L 41/0893* (2022.01)
*H04L 47/12* (2022.01)

(52) U.S. Cl.
CPC .......... *H04L 41/0893* (2013.01); *H04L 47/12* (2013.01)

(58) Field of Classification Search
CPC ............................. H04L 41/0893; H04L 47/12
USPC ........................................................ 709/220
See application file for complete search history.

(56) References Cited

U.S. PATENT DOCUMENTS

| | | | | |
|---|---|---|---|---|
| 2007/0094662 A1* | 4/2007 | Berstis | ................... | G06F 9/505 |
| | | | | 718/102 |
| 2011/0208941 A1* | 8/2011 | Gill | ...................... | G06F 3/0605 |
| | | | | 711/170 |
| 2012/0110063 A1* | 5/2012 | Prasad | .................. | G06Q 10/06 |
| | | | | 709/203 |
| 2021/0117978 A1* | 4/2021 | Silva | ................... | G06Q 20/4016 |
| 2021/0191756 A1* | 6/2021 | Chen | ..................... | G06F 9/5038 |
| 2022/0261278 A1* | 8/2022 | Perneti | ................. | G06F 9/5027 |
| 2025/0106279 A1* | 3/2025 | Tripathi | .............. | H04L 67/1012 |

OTHER PUBLICATIONS

C. Wang, K. C.-C. Chang, P. Wang, T. Qin and X. Guan, "Heterogeneous Network Crawling: Reaching Target Nodes by Motif-Guided Navigation," IEEE Transactions on Knowledge and Data Engineering, vol. 34, No. 9, pp. 4285-4297, 2022.

X. Wang, R. Garnett and J. Schneider, "Active Search on Graphs," in Active Search on Graphs, Chigago, 2013.

F. Murai, D. Rennó, B. Ribeiro, G. Pappa, D. Towsley and K. Gile, "Selective harvesting over networks," Data Mining and Knowledge Discovery, No. 32, pp. 187-217, 2018.

J. Figueira, S. Greco and M. Ehrogott, Multiple Criteria Decision Analysis: State of the Art Surveys, New York, NY: Springer New York, 2005.

* cited by examiner

*Primary Examiner* — Nicholas R Taylor
(74) *Attorney, Agent, or Firm* — Workman Nydegger (57) ABSTRACT

One example method includes receiving a workload specification from a user, building an initial heterogeneous network (HN) using a group of seed nodes, expanding the HN by: iteratively querying an infrastructure to identify, after each iteration, a node in the infrastructure that is capable of executing a workload identified by the workload specification; and adding the nodes to the HN, then when a budget has been exhausted, stopping the expanding of the HN, and ranking the nodes of the HN, and sending the workload to a highest-ranking node.

20 Claims, 7 Drawing Sheets

HETEROGENEOUS NETWORK HARVESTING MODELING FOR WORKLOAD PLACEMENT

FIELD OF THE INVENTION

Embodiments of the present invention generally relate to workload placement in a network. More particularly, at least some embodiments of the invention relate to systems, hardware, software, computer-readable media, and methods, for building a heterogeneous network and identifying, within that heterogeneous network, the node(s) best suited to execute a particular identified workload.

BACKGROUND

Many real-world problems can be modeled as a graph structure capable of representing entities and different relationships between them. In many cases, the acquisition of data associated to nodes and edges in such networks is difficult and querying nodes can have a steep cost. Thus, it is often the case that a large fraction of the data to be modeled is unobserved, and there is only a limited budget to perform queries to explore and discover useful information.

Infrastructures can be mapped as graphs, where nodes represent virtual instances and edges represent the path to be taken to get from one node to another, from the connectivity aspect. Often, there is a need to identify the best available infrastructure to run a workload considering constraints regarding dataset restrictions, such as size and usage for example, resource availability and the cost to transition from one node to another, in a budget constraint scenario where there may only be access to a small portion of nodes. Besides a steep cost, modeling such constraints properly in a workload placement scenario requires the use of a more complex structure called a Heterogeneous Network (HN). The problem of finding specific nodes for partially unknown networks topologies under a query budget constraint is called Selective Harvesting (SH).

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to workload placement in a network. More particularly, at least some embodiments of the invention relate to systems, hardware, software, computer-readable media, and methods, for building a heterogeneous network and identifying, within that heterogeneous network, the node(s) best suited to execute a particular identified workload.

One example embodiment is directed to a method for modeling the placement of a workload as a heterogeneous graph search on a partially observed network topology. One example of such a method comprises the following operations: building an infrastructure graph as a HN—in the HN, each node represents one different infrastructure, and may comprise various attributes such as infrastructure resources, topology information, and data availability—and each edge in the infrastructure graph is directed to the nodes that have a direct connection in the network, and each edge may encode information about network aspects, including latency and bandwidth.; applying an SH solution to identify the node(s) best suited to run the workload; ranking the nodes according to their suitability; and, orchestrating the workload to the highest ranked node for execution.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in anyway. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment is that an infrastructure may be mapped as a heterogeneous graph that provides rich information about the nodes and edges. This approach may be counterintuitive however, in that a heterogeneous graph is more difficult to search than a traditional graph structure. An embodiment may identify, at least within a partially observed graph topology, a best node to execute an identified workload. Various other advantages of one or more example embodiments will be apparent from this disclosure.

A. Aspects of a Context for One Embodiment

The following is a discussion of aspects of an example context for one or more embodiments. This discussion is not intended to limit the scope of the invention, or the applicability of the embodiments, in any way.

A.1 Graphs

Graphs are mathematical structures that may be used to represent relationships (edges) between entities (vertices or nodes). These structures may be used to model many problems. In many of these applications, the vertices (nodes) of a graph may contain valuable information about the entities being modeled on these structures. This set of information about the modeled entities may be referred to as 'attributes' of the nodes. In addition, the vertices of a graph may have some particular characteristics, that is, labels, which may make them a target for some tasks, or workloads.

A.2 Heterogenous Networks (HN)

Homogeneous networks are networks in which nodes and edges have a single meaning. For example, in a scientific collaboration network, every node represents a researcher while edges represent a collaboration between researchers in a scientific work. Another example is web crawling, where the nodes represent web pages only and edges represent hyperlinks only.

Although research has focused on homogeneous networks, there is a recent increase in interest in heterogeneous networks. In it, nodes and edges may carry multiple meanings and types, since entities and relationships are not necessarily the same across the domain that is being modelled. For example, a node in a referral network may carry labels such as person, group, institution, corporation, and government, and edges may mean 'node a endorses/recommends node b' or, contrarily, 'node a denounces/criticizes node b.'

Figure 1:
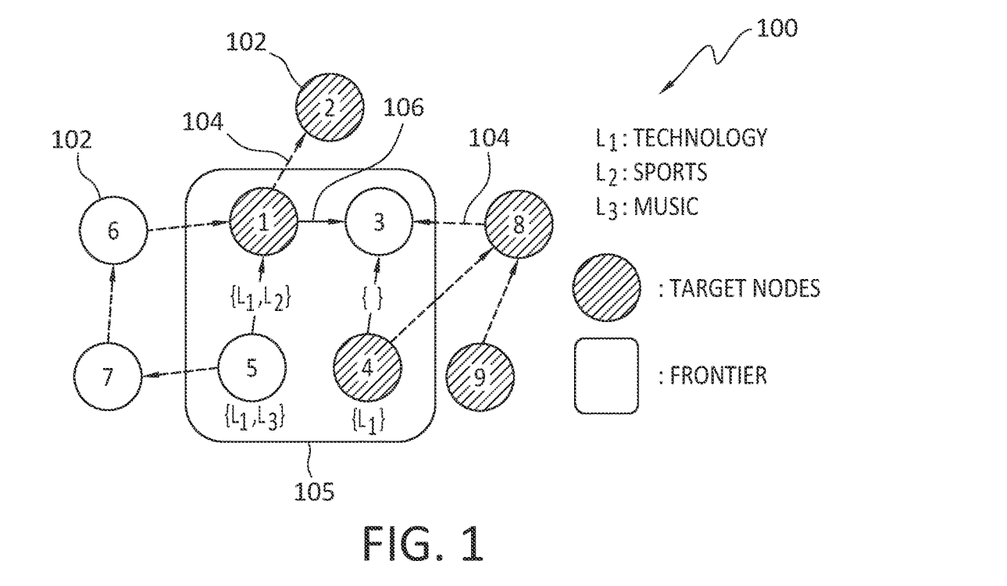
FIG. 1 discloses aspects of an example of a heterogeneous network.

With reference now to FIG. 1, there is disclosed an example of a heterogeneous network 100 such as may be constructed to represent Twitter® users and their relationships. A node 102, that is, a user in this example, may have multiple labels according to his tastes such as Technology, Sports, or Music. For example, nodes 1 and 4 are target nodes and they both have labels L1, but not L3 such as node 5 has. In the example of FIG. 1, dashed edges 104 represent edges whose endpoints are outside of the frontier 105 of known nodes 102, while solid edges 106 have both endpoints within the frontier 105. FIG. 1 also illustrates that heterogeneous nodes, that is, users, of Twitter® may have multiple types, or labels, and edges have a double meaning of follower/followed.

A.3 Search in Graphs

Search in graphs refers to the process of traversing a graph, a subgraph or a set of interconnected nodes in order to find one or more specific node or path. Graph search refers to a class of algorithms that systematically explore the nodes and edges of a graph, computing many interesting properties.

In many real networks, searching in a graph or accessing data associated with nodes and edges of the network is often difficult and querying nodes can have a steep cost in terms of time, processing power, and memory and storage requirements, for example. In these scenarios, it is often the case that a large fraction of the data to be modeled is unobserved, and there is only a limited budget of time and/or resources that is available to perform queries. Moreover, we may not be interested in the complete network, but only in a set of target nodes, that is, nodes with certain characteristics or attributes. In an embodiment, the budget may be expressed as a number of iterations available and/or permitted to build and expand an HN.

As an example, consider the problem of finding as many Facebook® users as possible that share a particular taste in music as possible, starting from the friendship network of a specific user. In this example, Facebook® users are nodes, friendship status are edges, and musical tastes are user attributes. Except for the Facebook® engineers themselves however, access to the networks is limited and it is impossible to query all nodes to determine their musical tastes.

A.4 Selective Harvesting (SH)

The problem of finding the largest number of target nodes for partially unknown network topologies under a query budget constraint is called Selective Harvesting (SH), first introduced in "X. Wang, R. Garnett and J. Schneider, '*Active Search on Graphs,*' in *Active Search on Graphs*, Chicago, 2013" ("X. Wang"), which is incorporated herein in its entirety by this reference.

SH can be stated as a graph search problem on partially unobserved network topology. However, due to the inherent complexity of the addressed problem, it can be framed from other perspectives, such as an unbalanced data classification problem, a reinforcement learning task or as an anomaly detection problem, to enumerate a few.

Figure 2:
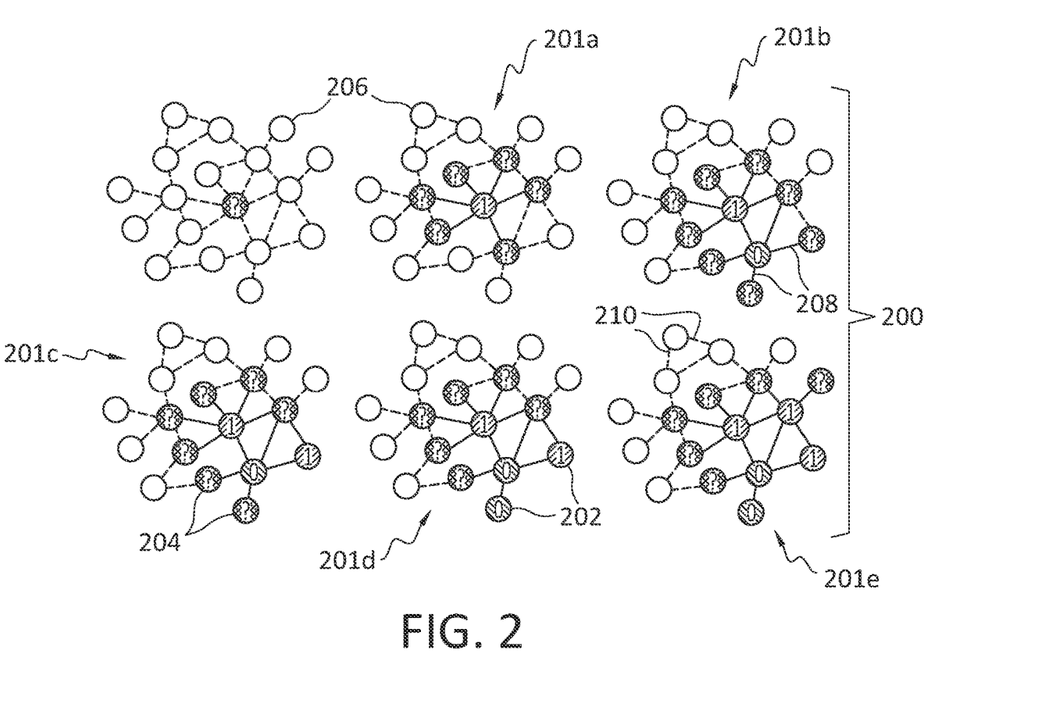
FIG. 2 discloses operations of an example SH (selective harvesting) search algorithm.

In SH, data is acquired through an online search or exploration of the graph, which can be seen as an evolving process that increases our knowledge about the network as the search expands. At each step, structural and non-structural information regarding topology, nodes and edges' data is acquired. Since the networks are partially unobserved in SH, the set of queried nodes and their connections to the rest of the network compose all available information about the network. FIG. 2 illustrates five consecutive stages 500 of an algorithm that performs SH search procedure.

In particular, the stages 200 are respectively denoted at 201a, 201b, 201c, 201d, and 201e, and the black, gray, and white, colors represent queried 202, unqueried 204, and unknown 206 nodes, respectively. Unqueried nodes 204 are candidate nodes to be queried because they border with at least one queried node 202. Nodes 206 that have no connections to queried nodes 202 are unknown until they get at the border and, thus, become unqueried 204. Solid 208 and dashed 210 lines represent known and unknown edges, respectively. Further, "1" indicates target nodes and "0" indicates non-target nodes. Nodes marked with "?" indicate an unknown label.

A.5 the MCrawl Algorithm

'MCrawl' is an advanced algorithm composed of multiples blocks that solves the selective harvesting (SH) problem in heterogeneous networks (HN). Aspects of MCrawl are disclosed in "C. Wang, K. C.-C. Chang, P. Wang, T. Qin and X. Guan, '*Heterogeneous Network Crawling: Reaching Target Nodes by Motif-Guided Navigation,*' *IEEE Transactions on Knowledge and Data Engineering*, vol. 34, no. 9, pp. 4285-4297, 2022" ("C. Wang"), which is incorporated herein in its entirety by this reference.

The MCrawl algorithm can be understood as a heterogeneous crawling framework. Briefly, MCrawl performs a guided search in a partially observed HN using a motif-based patterns approach. Motifs generalize the concept of link-based homophily—"close" nodes tend to be linked to each other—to HNs by asserting that "close" nodes tend to link "in certain ways with those which are similar to them in particular ways."

Figure 3:
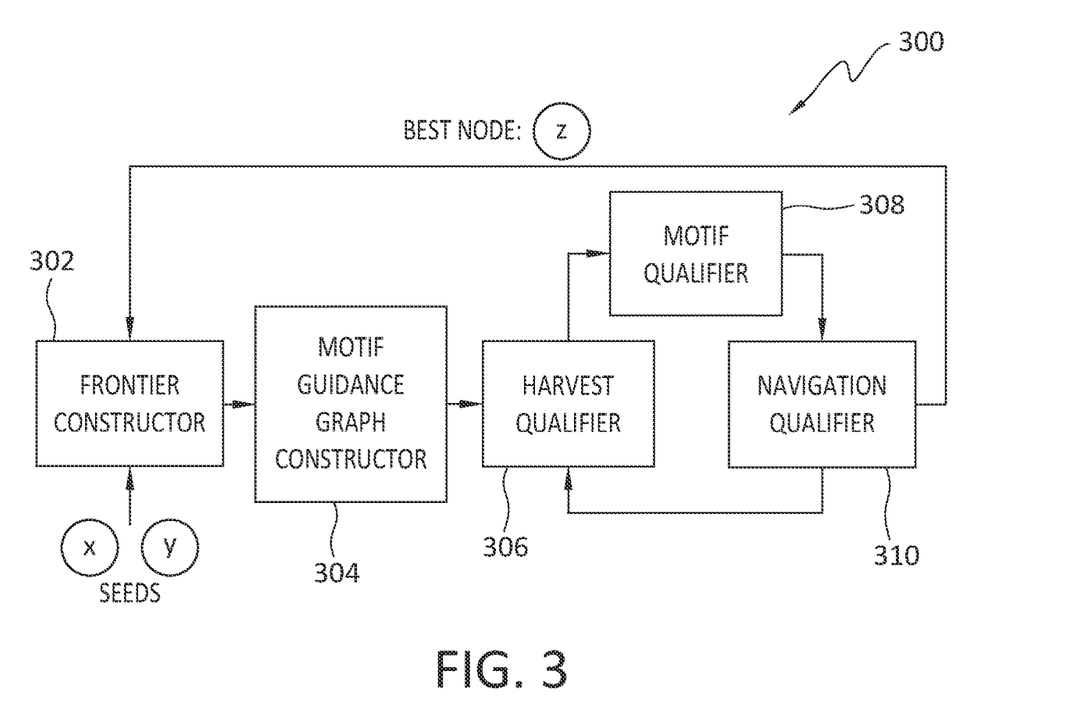
FIG. 3 discloses aspects of the MCrawl algorithm.

Overall, the framework operates iteratively by expanding the frontier of known nodes one node at a time. To decide which node is the best node to be incorporated from the frontier—and the best node to be queried —, a complex semi-supervised probabilistic process of motif extraction, generation, and matching is performed. This iterative process continues while the query budget permits. Furthermore, MCrawl requires an initial set of seed nodes from where the search is to be started. FIG. 3 discloses the MCrawl process 300 in more detail.

Particularly, as shown in FIG. 3, the MCrawl algorithm 300 flow schematic may involve the use of five blocks operable to find the best node to expand the known network from the set of seed nodes. These blocks are the frontier constructor 302, motif guidance constructor 304, harvest qualifier 306, motif qualifier 308, and navigation qualifier 310. Details concerning the operation of these blocks are disclosed in C. Wang.

B. Overview of Aspects of an Example Embodiment

B.1 Introduction

One example embodiment is concerned with the problem of finding the best available node that meets all necessary requirements of the application, that is, a workload, in the shortest and best possible path, considering a workload placement problem modeled as an SH task on HN. One embodiment may begin by building a pipeline to model workloads as HNs with partially observed topology that will be applied to an SH model to find the best available node that meets all necessary requirements of the application in the shortest and best possible path.

An embodiment of the invention may address various circumstances and problems, one of which is modeling modeling workloads and their constraints as an HN. In particular, HNs are complex structures that contain different types of information besides nodes and edges as in traditional graph modeling. More specifically, nodes and edges can have multiple meanings as opposed to classical networks where nodes represent a single entity type and edges represent a single relationship meaning. Moreover, most methods of traditional graph search do not perform on HNs.

Another problem that may be addressed by an embodiment is finding the best available node that meets all necessary requirements of the application in the shortest and best possible path using the smallest amount of network probing. Particularly, in a workload placement scenario, most nodes and edges are unobserved; thus, we do not have access to all information of such nodes. Moreover, querying the entire network is unfeasible due to limited available time and resources. Finally, the search process on partially unobserved networks is not trivial, as it becomes a ranking problem where the process must choose which node to be queried in the next iteration step to attempt all problem constraints.

B.2 Overview

An embodiment may operate to model a workload placement as a heterogenous graph search on partially observed network topologies problem. Thus, an embodiment may choose the best node to be queried in each iteration step of the search aiming to attempt all problem's constraints. One embodiment of the method comprises two main processes.

The first process is building the HN. In this process, an embodiment builds the infrastructure graph as a HN. In an embodiment, the infrastructure on which the infrastructure graph is based may be a network infrastructure, or any other structure in which a workload, such as a computing workload, may be executed.

In the infrastructure graph, each node represents one different infrastructure. Further, each node may have a set of attributes made up of various different types of features. Examples of such features include, but are not limited to: infrastructure resources—for example, available memory, number of CPU (central processing unit) cores, presence/absence of GPUs (graphics processing units), and number of GPUs; topology Information—for example, node centrality (represents the topological importance of a node), normalized degree (number of available neighbors), component size (size of the of the component where the node belongs), and clustering coefficient (local neighborhood density of a node); and, data availability, that is, which datasets are available in each node.

In an embodiment, each edge is directed to the nodes that have a direct connection in the network. Each edge encodes the information about the network aspects, such as latency and bandwidth for example.

The second process included in an example embodiment is the application of a selective harvesting solution to the HN that was built using the first process discussed above. For example, by using the MCrawl algorithm for SH problem in a HN, an embodiment can select the better ranked node, to run a workload, from a set of candidates provided by the guided exploration of the graph considering the infrastructure features, the network aspects, and the datasets availability. Additionally, the guided nature of the algorithm may provide at least two benefits from the perspective of a system, namely, (i) the search is directed at the most promising regions of the unobserved network considering the task at hand, and (ii) the network is less strained when compared to an exhaustive or a random walk search.

B.3 Further Discussion

As will be apparent from this disclosure, one or more example embodiments may possess various useful features and aspects. However, no embodiment is required to include any of such features or aspects. The following examples are illustrative.

An embodiment may operate to model workloads and their respective constraints as a heterogeneous graph. Although workloads and infrastructure may be mapped as graphs, an embodiment may model this scenario as an HN, in which nodes and edges have different types of semantics. Heterogeneous networks are more complex structures than traditional graphs and, for that reason at least, represent a greater challenge for search problems.

As another example, an embodiment may model workload placement as a partially observed graph search problem. For example, in a workload placement scenario, most nodes and edges are unobserved. Thus, a user may not have access to all information of such nodes. Moreover, querying the entire network is unfeasible due to limited available time and resources. Thus, an embodiment may model workload placement problem as a partially observed graphs search problem in a heterogeneous network.

As a final example, an embodiment may build, comprise, and employ, a pipeline to find the best available node in a harvesting scenario for workload placement problem. For example, an embodiment may address the workload placement problem modeled as a heterogenous network as the problem of finding the best available node that meets all necessary requirements of the application in the shortest and best possible path, in a partially observed graph topology.

C. Detailed Discussion of Aspects of an Example Embodiment

Figure 4:
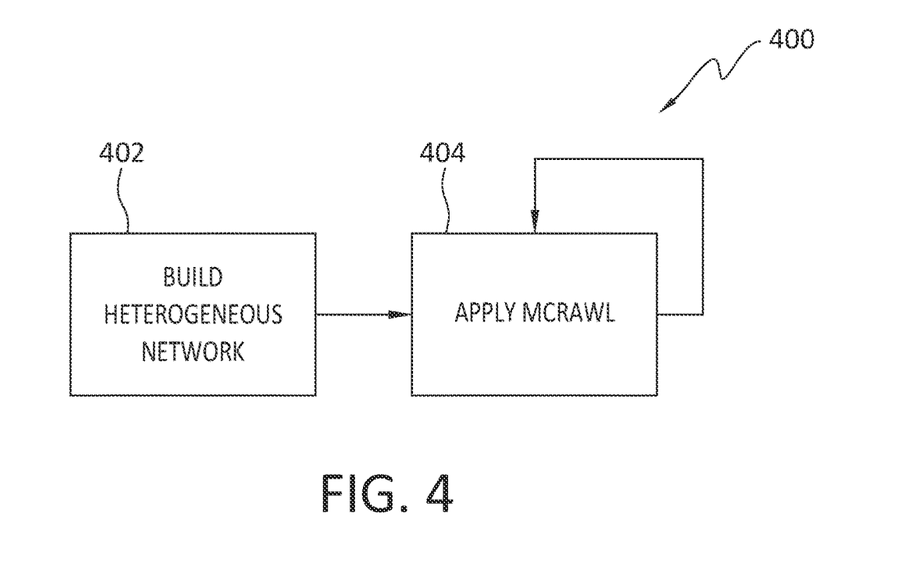
FIG. 4 is a high level diagram of aspects of an example embodiment.

Following is a detailed discussion of the two processes, or steps, outlined above at B.1. FIG. 1 discloses a high-level diagram depicting an embodiment of the two-step process 400. In the illustrated embodiment, process 400 comprises the building 402 of a heterogeneous network, and application 404, possibly iteratively, of the MCrawl algorithm to that heterogeneous network. That is, in an embodiment, the harvesting process iteratively occurs by applying the MCrawl algorithm to expand the HN while the budget allows.

The following discussion is presented in three sections, or parts. The first part will examine and exemplify the modelling of an infrastructure network as a HN, the second part will abstract the modelling and focus on all the smaller building blocks of the proposed solution, and the third part will focus on the interaction between the user, the orchestrator, and the infrastructure network.

C.1 Heterogeneous Network (HN) Modelling

The first step on SH for HNs comprises modelling the network, or other infrastructure, as a graph where nodes and edges carry multiple types of information in the form of attributes. In the specific case of the workload placement problem, an embodiment may first determine which relevant information regarding network infrastructure will be placed on the HN graph. In an embodiment, such information may comprise node attributes. As noted above, example node attributes include, but are not limited to, infrastructure resources, topology information, and data availability. Various additional information may be attributed to one or more of the nodes, depending on the infrastructure scenario. Further, edges may have multiple types of information, and may imply multiple different meanings or relationships.

Figure 5:
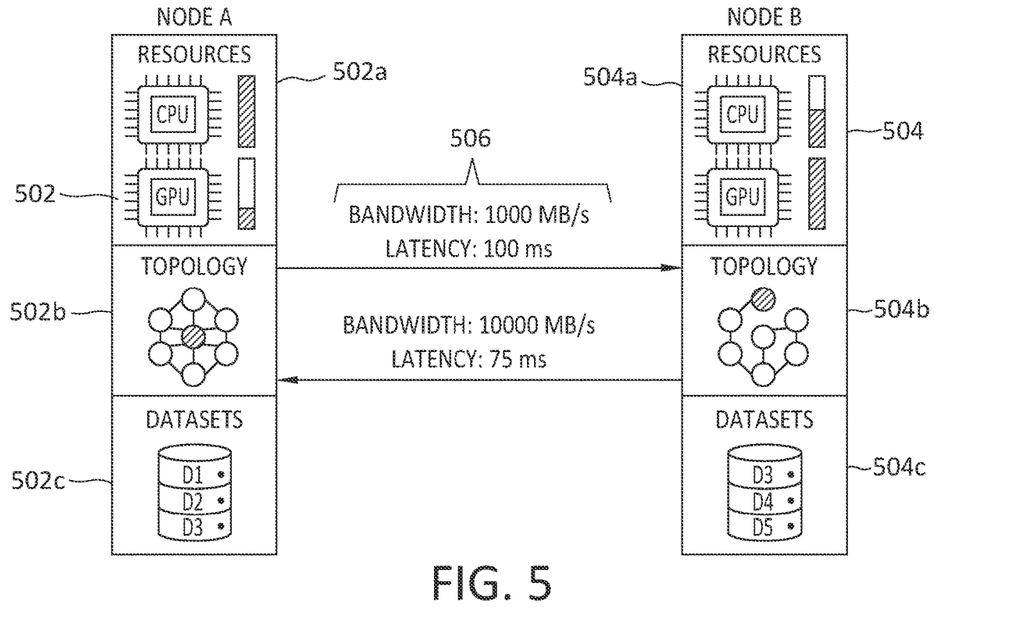
FIG. 5 discloses an example of how two infrastructure nodes may be modelled as nodes in a HN (heterogeneous network), according to one embodiment.

FIG. 5 discloses an example of two connected nodes, 502 and 504, in an infrastructure where both nodes and edges have multiple types of information. In FIG. 5, the two infrastructure nodes 502 and 504 comprise various respective infrastructure resources 502*a* and 504*a*, topology information 502*b* and 504*b*, and data/data availability 502*c* and 504*c*. Also, links 506 between these infrastructure nodes may be represented as HN edges carrying information about bandwidth in addition to latency, for example. The example of FIG. 5 discloses how, in an embodiment, the semantics in an HN can be rich enough to better guide the harvesting process.

C.2 the Orchestrator

As noted, a method according to one embodiment may begin by building an initial version, or representation, such as a graph for example, of the infrastructure as an HN. In this initial build, only a minor sample of the infrastructure may be collected to build the HN, which may comprise a graph model of the infrastructure. The nodes in this initial sample may be referred to as the 'cold start' set, or 'seed' in the MCrawl framework, of the harvesting procedure.

Figure 6:
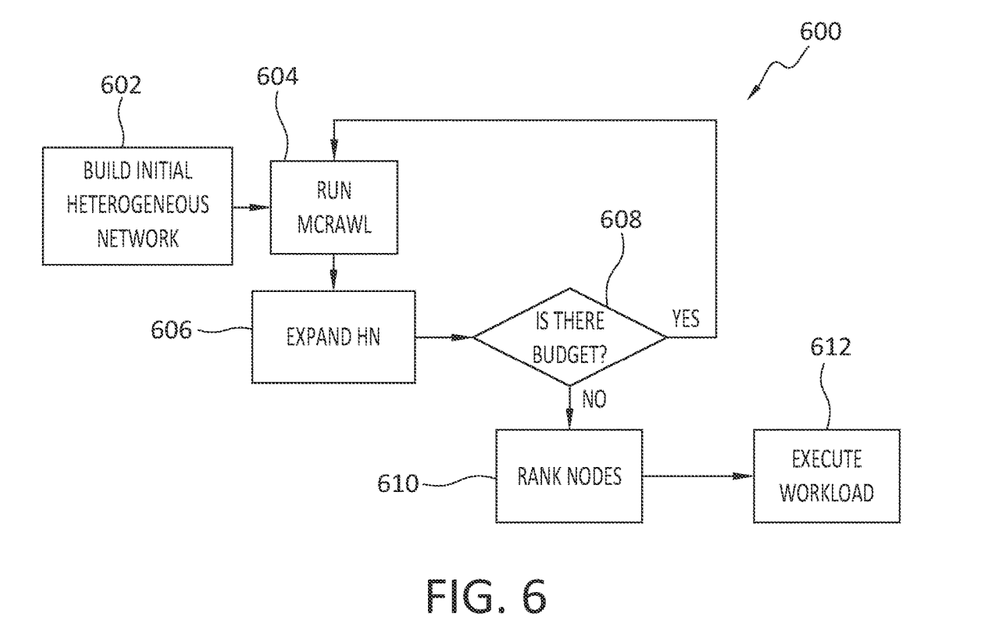
FIG. 6 discloses aspects of an overall process for workload execution under a HN modelling, according to one embodiment.

In an embodiment, this initial HN may be built as a simple random walk in the infrastructure, or the initial HN may be formed of a pre-selected set of nodes. After the HN is built, the second step starts which is iteratively repeated until the budget depletes. At this point, the HN is not expanded anymore. The higher the budget, the larger the resulting HN becomes. FIG. 6 discloses an example embodiment of this two-step process.

In particular, FIG. 6 discloses an embodiment of an overall method 600 for workload execution under an HN modelling approach. The harvest process starts by building 602 the initial HN and then iteratively applying 604 the MCrawl algorithm to expand 606 the HN. This method 600 may iterate one node at a time until the budget gets depleted. Thus, after each HN expansion 606, a check 608 may be performed to determine if adequate budget remains for at least one more iteration. If so, the method 600 may return to 604. On the other hand, if it is determined at 608 that adequate budget does not remain, then the feasible nodes are ranked 610, possibly automatically, according to previously set criteria, which may be provided by a user, and the highest ranked node may then be chosen to execute 612 the workload. Note that the process of expanding 606 the HN by adding nodes may be referred to herein as a 'harvest,' or 'harvesting' process.

In an embodiment, the budget is the number of iterations that MCrawl algorithm can be applied to expand the HN. In general, a larger budget may yield a better chance of finding a good match to place the workload requested by the user, while a smaller budget may hinder the search process as the algorithm will have fewer iterations to acquire relevant information about the network. This is disclosed in FIG. 7.

Figure 7:
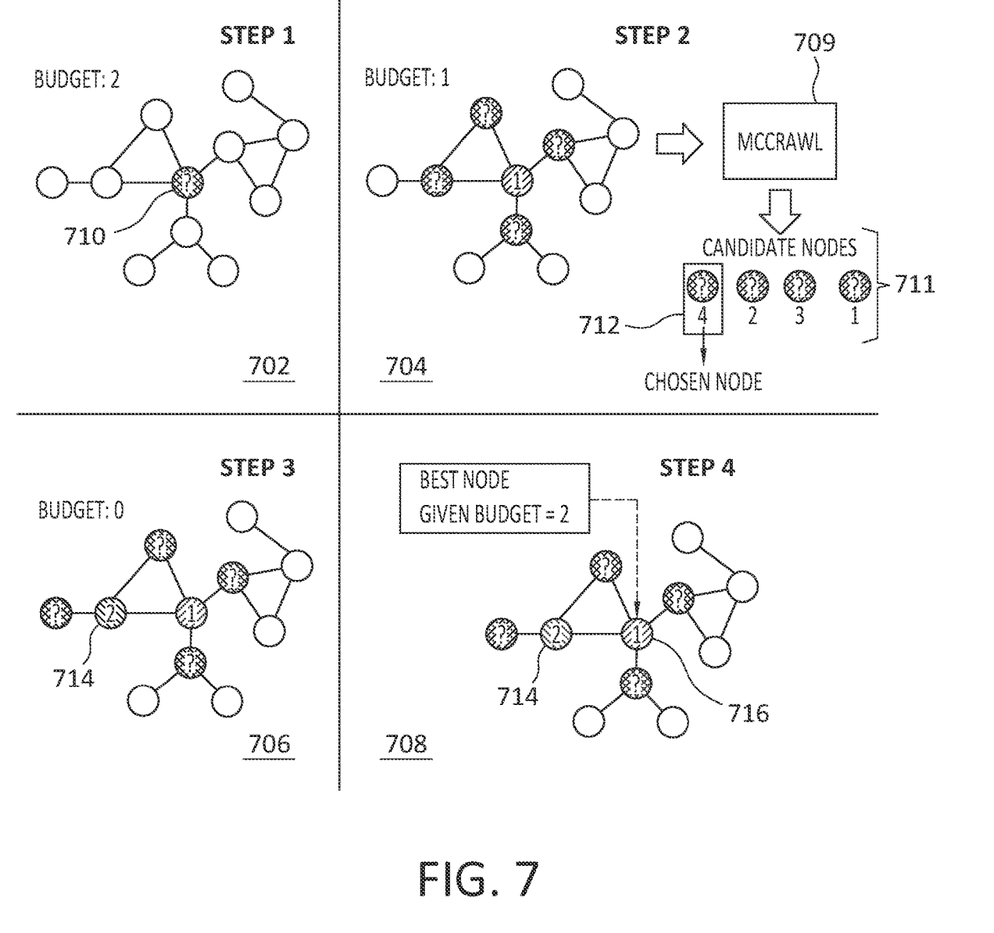
FIG. 7 discloses a simplified execution of MCrawl in a small graph.

Particularly, FIG. 7 discloses a simplified execution, comprising four steps 702, 704, 706, and 708, of the MCrawl algorithm 709 in a small graph. Note that the budget is decreased by one unit at each step except the last one. This example starts at step 1 (702) with the '?' node 710 as a seed and proceeds to step 2 (704) where the budget is decreased, from 2 to 1, as MCrawl tries to expand the HN to four more neighbors 711 at the border. MCrawl then decides where it will guide the search to and selects a node 712 to add to the HN. In step 3 (706), the node 714 (2) is selected to compose the already known network. At step 4 (708), a choice must be made between nodes 1 and 2, to execute the workload, supposing that both are target nodes. In the example of FIG. 7, the final node chosen is node 716 (1). It is noted that while the 'chosen node' is designated as '4' in the list of neighbors 711, that node is the second to be added to the HN and as such is designated at '2' in step 3 (706) and step 4 (708).

Figure 8:
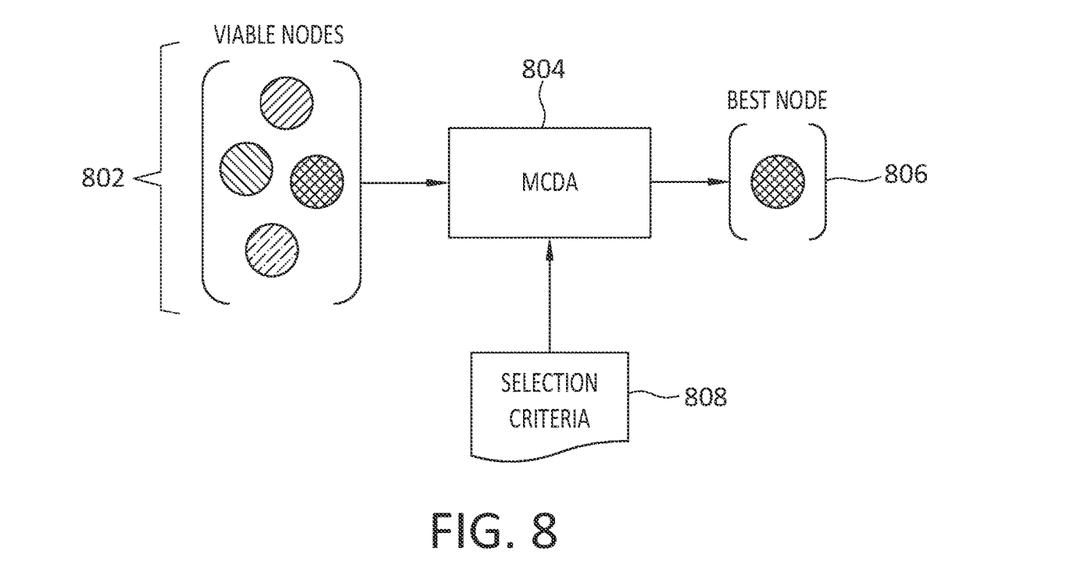
FIG. 8 discloses an example node selection process, according to one embodiment.

A ranking process is included in the last step 4 (708) of the approach disclosed in FIG. 7, and its primary task is to determine which is the better ranked node to execute the given workload among the feasible nodes harvested by the MCrawl algorithm. In an embodiment, the feasible nodes should all be capable of satisfying the workload requirements. However, some nodes may be regarded as preferable to others depending on the criteria used by the orchestrator. The criteria must be inputted to the orchestrator so it can employ any Multi-Criteria Decision Analysis (MCDA) method, as disclosed in X. Wang. The MCDA black-box includes any method available under the MCDA umbrella. FIG. 8 generally discloses an example of this decision process.

In particular, after the harvesting process, it is necessary to select the best node among all the feasible candidates 802. In an embodiment, this final selection is incumbent on a Multi-Criteria Decision Analysis (MCDA) 804 which selects the best node 806 with regards to a given selection criteria 808, or criterion. In an embodiment, this process may as be simple as selecting the fastest node, or the selection process may consider a combination of multiple factors, that is, criteria, such as SLAs, cost of using the node, the resources availability, real-time requirements.

C.3 Example Interactions

The process of harvesting in an HN, from a user perspective, requires the workload specification submission only. This is because, in one embodiment, an orchestrator may perform most of the work to build, expand, rank, and, ultimately, send the workload to be solved by the target node.

Suppose, for example, that the user has already sent the workload specification to the orchestrator, the orchestrator may then proceed to build the HN as a model of an infrastructure composed of networked computing devices. Once the building of the initial HN is completed, the main task of the orchestrator may be to expand this heterogeneous network as it explores the infrastructure in a guided way. Following the completion of this task, that is, depleting the budget to expand the network, the orchestrator needs to select the best node among all feasible candidates to execute the workload. The orchestrator may then orchestrate the workload to the best node for execution, and the output or result from the execution of the workload may then be returned to the user. This communication scenario is depicted in FIG. 9.

Figure 9:
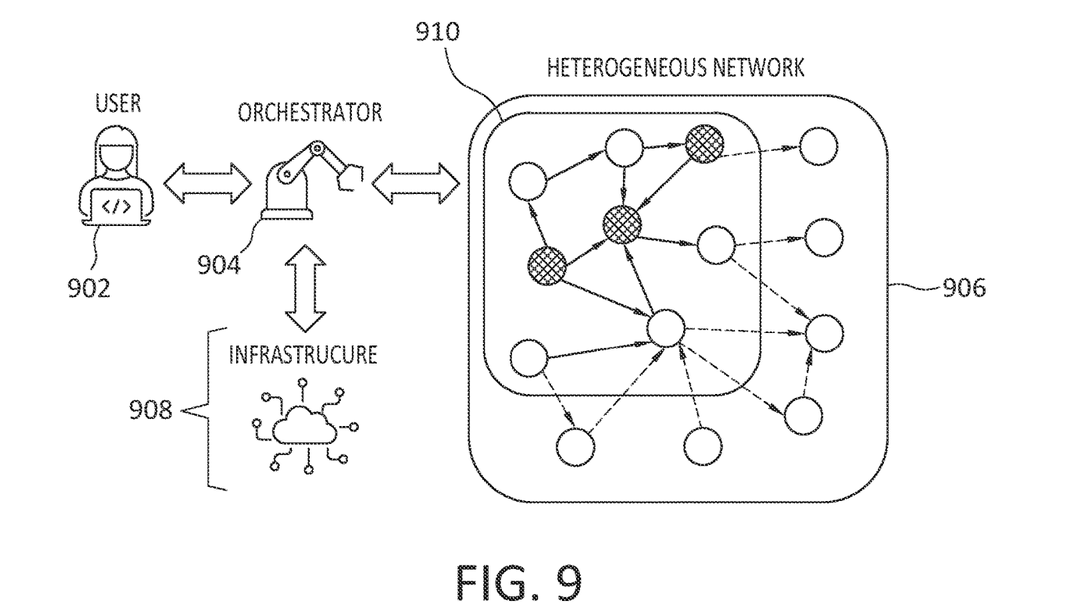
FIG. 9 discloses an example infrastructure and associated entities for building an HN, according to one embodiment.

In particular, FIG. 9 discloses an approach in which the user 902 makes a request for the orchestrator 904 to run a specific workload. The orchestrator 904 may then automatically starts building the HN 906 to find the better ranked node to execute the given workload. In this context, the HN 906 is a model of the real infrastructure network 908. The area 910 in the HN 906 represents the nodes known so far. In an embodiment, it is this area 910 that is expanded iteratively, and in a guided way, by the MCrawl algorithm.

Figure 10:
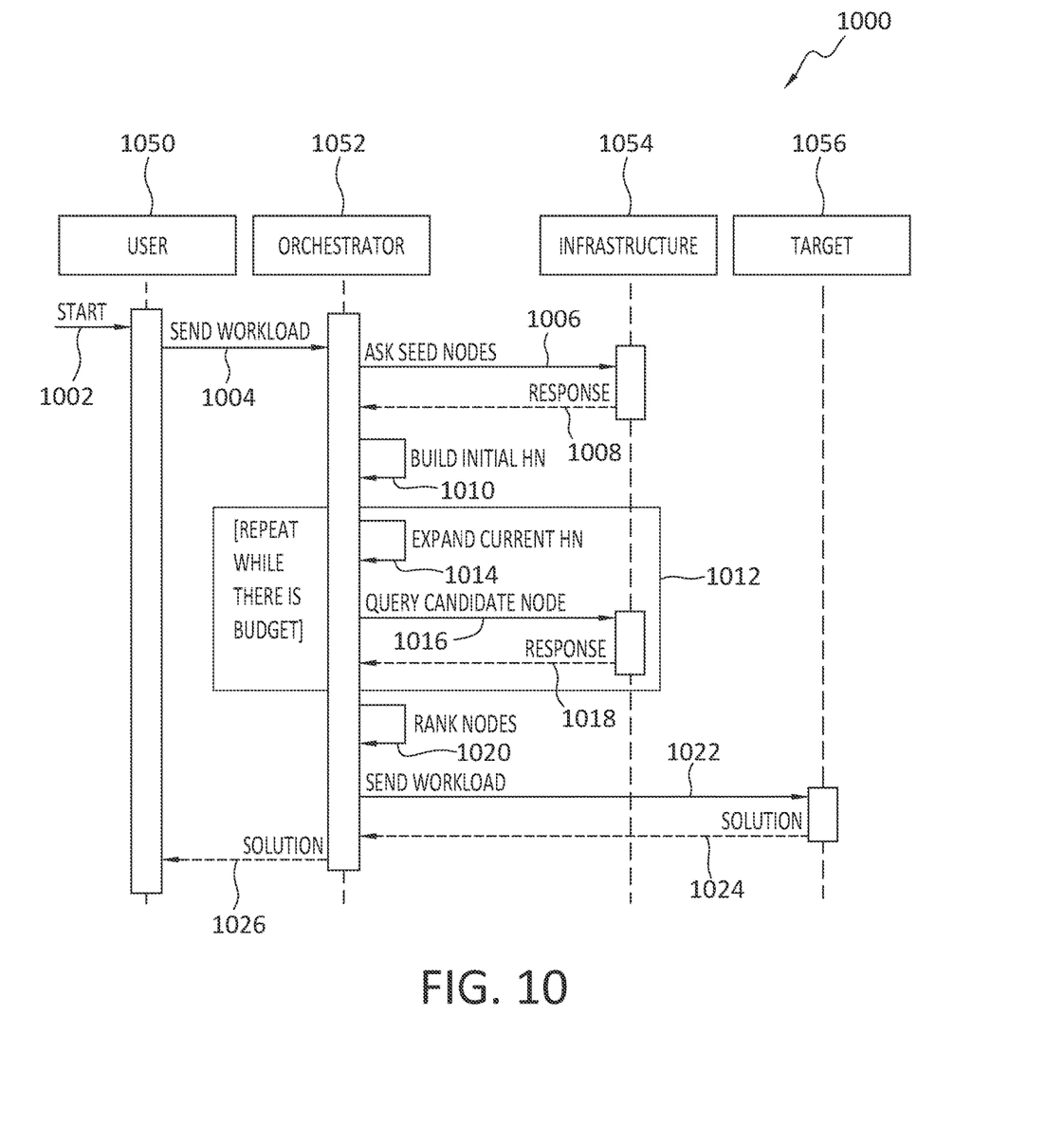
FIG. 10 discloses aspects of a method, according to one embodiment.

As such, the orchestrator 904 may interact many times with its HN 906 and the infrastructure 908 during the whole process. It is noted that this process on harvesting is less burdensome to the infrastructure than an exhaustive search of the entire infrastructure 908, while achieving much better results than a random walk on the graph since the central idea in SH is to (1) uncover the maximum number of a positive nodes (2) with the least number of queries to the infrastructure 908. Furthermore, this process is robust enough to execute in dynamic networks because the HN 906 will have to be regenerated each time the user sends a new workload request. FIG. 10 discloses this interaction process in more detail, and it is noted that the HN expansion step may be performed within a loop.

As shown in the example of FIG. 10, various entities may be involved in the performance of the example method 1000. These entities may include, but are not limited to, a user 1050, an orchestrator 1052, infrastructure 1054, and a target node 1056. Note that the target node 1056 may not be identified until after the orchestrator 1052 has ranked the nodes of the HN, as discussed below.

In an embodiment, the method 1000 may begin 1002 when the user 1050 sends 1004 a workload specification to the orchestrator 1052. A simple example of a workload specification might be: "the workload runs microservices a, b, and c, requiring at least x CPUs and y GPUs as well as p, q, and r datasets." The orchestrator 1052 may then communicate with the infrastructure 1054 until the best candidate is found.

In more detail, the orchestrator 1052 may identify an initial set of seed nodes from the infrastructure 1054, and request 1006 information, such as node attributes for example, about the seed nodes from the infrastructure 1054. A response 1008 with this information may then be received by the orchestrator 1052 and used by the orchestrator 1052 to build 1010 an initial HN.

After the initial HN is built 1010, the orchestrator 1052 may enter a loop 1012 that may continue to be performed so long as budget is available. As shown, the example loop 1012 may generally operate to expand 1014 the HN over one or more iterations. More specifically, after the initial HN is built 1010, the orchestrator 1052 may iteratively query 1016 a candidate node of the infrastructure 1054, and based upon the response 1018 from the candidate node, the orchestrator 1052 may expand 1014 the HN. As noted, this process may continue so long as there is budget available for at least one more iteration.

After the budget has been exhausted, or based on the occurrence, or non-occurrence, of some other event, the orchestrator 1052 may then rank 1020 the nodes of the HN with respect to their suitability to carry out the workload identified in the workload specification. Once the nodes have been ranked 1020, the orchestrator 1052 may then transmit 1022 the workload specification to the highest-ranked node, that is, the target node 1056.

The target node 1056 may then execute the workload, and return 1024 the results, which may comprise a solution to a problem, to the orchestrator 1052. The results may then be transmitted 1026 by the orchestrator 1052 to the requestor, the user 1050 in this example.

D. Example Methods

It is noted with respect to the disclosed methods, including the example respective methods of FIGS. 1-10, that any operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

E. Further Example Embodiments

Following are some further example embodiments of the invention. These are presented only by way of example and are not intended to limit the scope of the invention in any way.

Embodiment 1. A method, comprising: receiving a workload specification from a user; building an initial heterogeneous network (HN) using a group of seed nodes; expanding the HN by: iteratively querying an infrastructure to identify, after each iteration, a node in the infrastructure that is capable of executing a workload identified by the workload specification; and adding the nodes to the HN; when a budget has been exhausted, stopping the expanding of the HN, and ranking the nodes of the HN; and sending the workload to a highest-ranking node.

Embodiment 2. The method as recited in any preceding embodiment, wherein after the budget has been exhausted, the HN contains fewer than all nodes of the infrastructure, such that the infrastructure is only partially known.

Embodiment 3. The method as recited in any preceding embodiment, wherein the HN comprises a graph of the infrastructure.

Embodiment 4. The method as recited in any preceding embodiment, wherein each of the nodes in the HN is associated with respective information concerning infrastructure resources, topology, and data availability.

Embodiment 5. The method as recited in any preceding embodiment, wherein the nodes of the HN are joined by edges that each encode information about the infrastructure.

Embodiment 6. The method as recited in any preceding embodiment, wherein the seed nodes are obtained by a random walk through the infrastructure, or are pre-selected.

Embodiment 7. The method as recited in any preceding embodiment, wherein the querying of the infrastructure is non-random.

Embodiment 8. The method as recited in any preceding embodiment, wherein the HN is regenerated for a new workload specification.

Embodiment 9. The method as recited in any preceding embodiment, wherein the infrastructure comprises a computing network.

Embodiment 10. The method as recited in any preceding embodiment, wherein the ranking of the nodes is performed based on a search of the HN.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims. As used herein, the term 'module' or 'component' may refer to software objects or routines that are being executed on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 11:
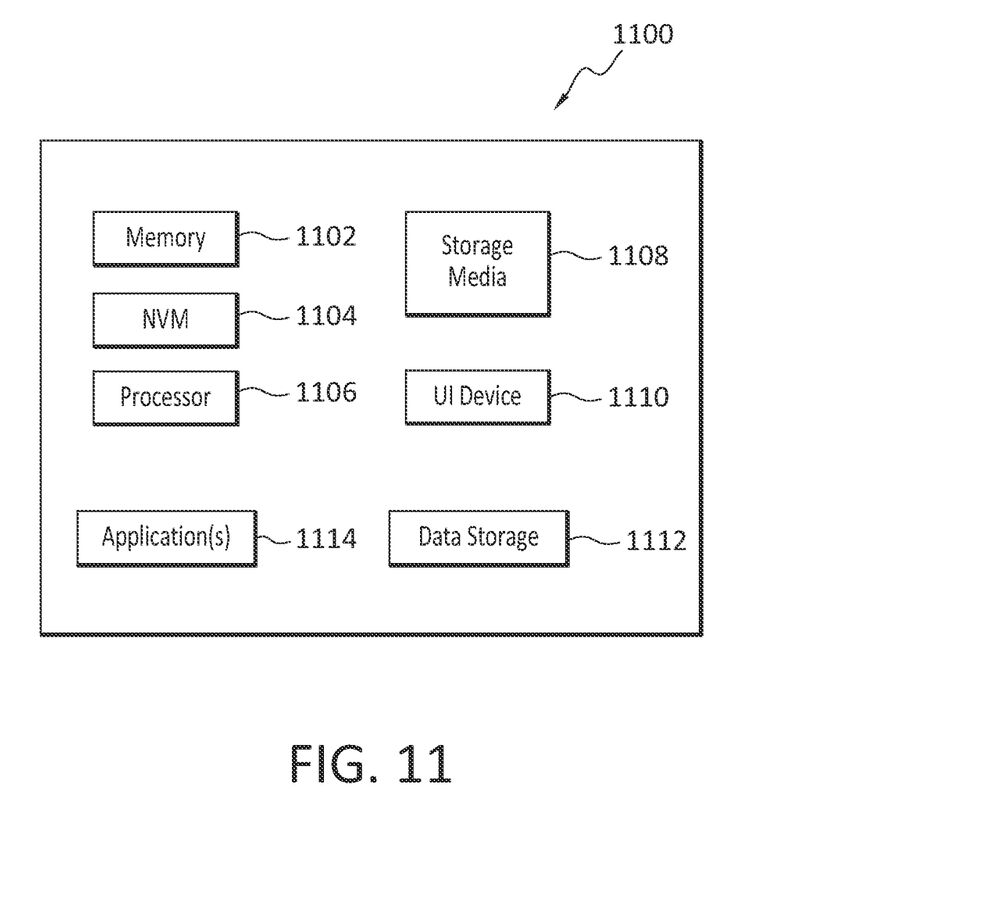
FIG. 11 discloses an example computing entity configured and operable to perform any of the disclosed methods, processes, and operations.

With reference briefly now to FIG. 11, any one or more of the entities disclosed, or implied, by FIGS. 1-10, and/or elsewhere herein, may take the form of, or include, or be implemented on, or hosted by, a physical computing device, one example of which is denoted at 1100. As well, where any of the aforementioned elements comprise or consist of a virtual machine (VM), that VM may constitute a virtualization of any combination of the physical components disclosed in FIG. 11.

In the example of FIG. 11, the physical computing device 1100 includes a memory 1102 which may include one, some, or all, of random access memory (RAM), non-volatile memory (NVM) 1104 such as NVRAM for example, read-only memory (ROM), and persistent memory, one or more hardware processors 1106, non-transitory storage media 1108, UI device 1110, and data storage 1112. One or more of the memory components 1102 of the physical computing device 1100 may take the form of solid state device (SSD) storage. As well, one or more applications 1114 may be provided that comprise instructions executable by one or more hardware processors 1116 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   receiving a workload specification from a user;
   building an infrastructure graph for a plurality of nodes based on a network infrastructure;
   building a heterogeneous network (HN) using a group of seed nodes in the infrastructure graph;
   expanding the HN by:
     iteratively querying the infrastructure graph to identify, after each iteration, an adjacent node in the infrastructure graph that is capable of executing a workload identified by the workload specification; and
     adding the adjacent node to the HN;
   when a budget has been exhausted, stopping the expanding of the HN, and ranking nodes of the HN; and
   sending the workload to a highest-ranking node.

2. The method as recited in claim 1, wherein after the budget has been exhausted, the HN contains fewer nodes than all nodes of the infrastructure graph, such that the infrastructure graph is only partially known.

3. The method as recited in claim 1, wherein the HN comprises a partial graph of the infrastructure graph.

4. The method as recited in claim 1, wherein each of the nodes in the HN is associated with respective information concerning infrastructure resources, topology, and data availability.

5. The method as recited in claim 1, wherein the nodes of the HN are joined by edges that encode information about the infrastructure.

6. The method as recited in claim 1, wherein the group of seed nodes are obtained by a random walk through the infrastructure graph, or are pre-selected.

7. The method as recited in claim 1, wherein the querying of the infrastructure graph is non-random.

8. The method as recited in claim 1, wherein the HN is regenerated for a new workload specification.

9. The method as recited in claim 1, wherein the network infrastructure comprises a computing network.

10. The method as recited in claim 1, wherein the ranking of the nodes is performed based on a search of the HN.

11. A non-transitory storage medium having stored therein instructions that are executable by one or more hardware processors to perform operations comprising:
    receiving a workload specification from a user;
    building an infrastructure graph for a plurality of nodes based on a network infrastructure;
    building a heterogeneous network (HN) using a group of seed nodes in the infrastructure graph;
    expanding the HN by:
      iteratively querying the infrastructure graph to identify, after each iteration, an adjacent node in the infrastructure graph that is capable of executing a workload identified by the workload specification; and
      adding the adjacent node to the HN;
    when a budget has been exhausted, stopping the expanding of the HN, and ranking the nodes of the HN; and
    sending the workload to a highest-ranking node.

12. The non-transitory storage medium as recited in claim 11, wherein after the budget has been exhausted, the HN contains fewer nodes than all nodes of the infrastructure graph, such that the infrastructure graph is only partially known.

13. The non-transitory storage medium as recited in claim 11, wherein the HN comprises a partial graph of the infrastructure graph.

14. The non-transitory storage medium as recited in claim 11, wherein each of the nodes in the HN is associated with respective information concerning infrastructure resources, topology, and data availability.

15. The non-transitory storage medium as recited in claim 11, wherein the nodes of the HN are joined by edges that encode information about the infrastructure.

16. The non-transitory storage medium as recited in claim 11, wherein the group of seed nodes are obtained by a random walk through the infrastructure graph, or are pre-selected.

17. The non-transitory storage medium as recited in claim 11, wherein the querying of the infrastructure graph is non-random.

18. The non-transitory storage medium as recited in claim 11, wherein the HN is regenerated for a new workload specification.

19. The non-transitory storage medium as recited in claim 11, wherein the network infrastructure comprises a computing network.

20. The non-transitory storage medium as recited in claim 11, wherein the ranking of the nodes is performed based on a search of the HN.

* * * * *